Nov. 8, 1949
C. P. STANLEY
2,487,577
ABSORPTION PROCESS
Filed Nov. 19, 1945
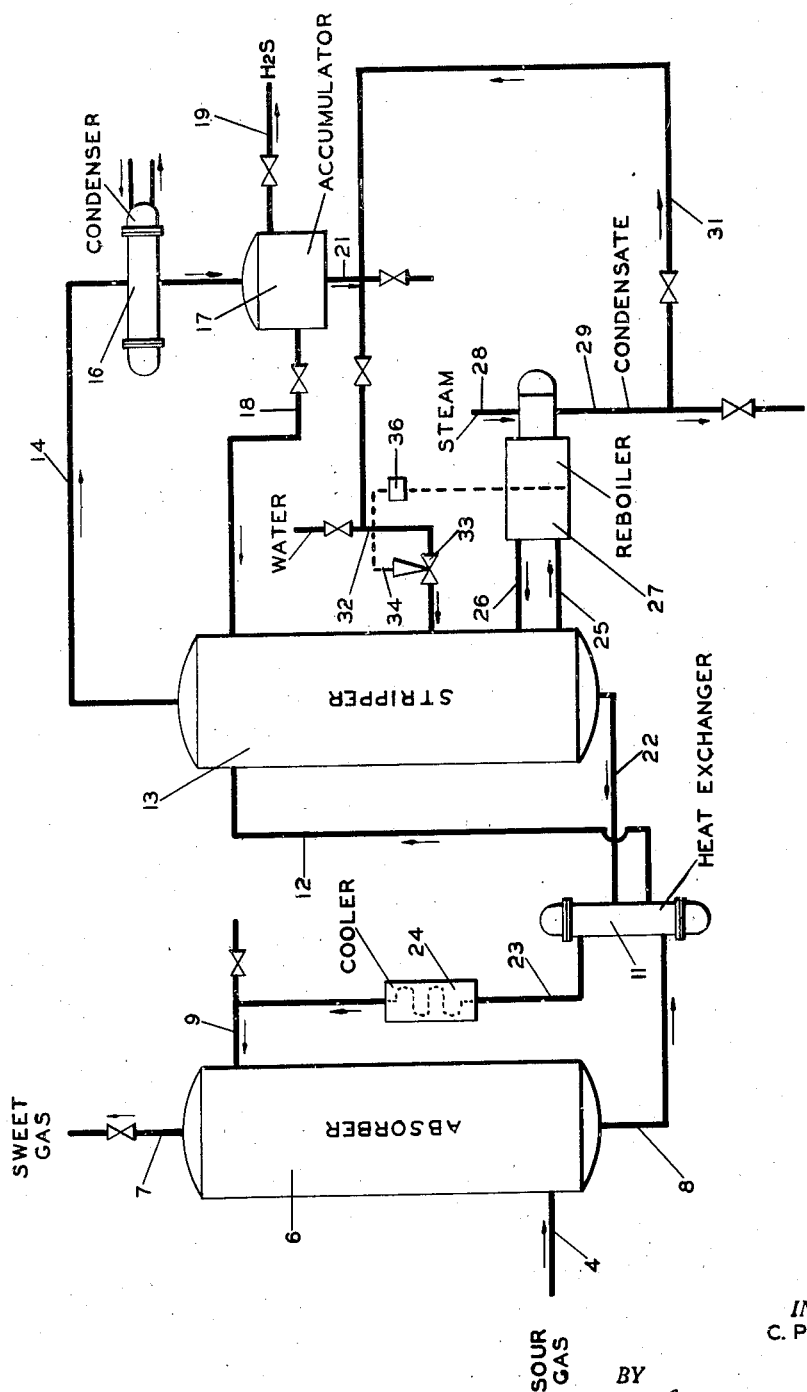
INVENTOR.
C. P. STANLEY
BY
*Hudson and Young*
ATTORNEYS Patented Nov. 8, 1949

2,487,577

UNITED STATES PATENT OFFICE 2,487,577

ABSORPTION PROCESS

Clyde P. Stanley, Phillips, Tex., assignor to Phillips Petroleum Company, a corporation of Delaware Application November 19, 1945, Serial No. 629,676

7 Claims. (Cl. 23—3)

This invention relates to the treatment of fluids containing acidic materials. In one aspect this invention relates to the removal of acidic materials, such as hydrogen sulfide, from gases. In another aspect this invention relates to the control of the water content of an aqueous absorption solution used for recovering acidic material from fluids. In another aspect this invention relates to the reactivation of an absorption solution.

Many gases used commercially for various purposes contain acidic materials which are detrimental to the use of these gases. Particularly, normally gaseous mixtures containing hydrocarbons, for example natural gas and light gases obtained from various hydrocarbon conversion processes, are used as fuel, as feed to hydrocarbon conversion processes, and in the production of carbon black. Acidic impurities, such as hydrogen sulfide, sulfur dioxide and carbon dioxide, contained in these gases often interfere with chemical reactions in which the gases are involved as well as being injurious to the equipment which the gases contact. The detrimental effect of the acidic impurities necessitates their removal from the gases. These acidic materials may be removed and recovered from gases as valuable products, especially hydrogen sulfide which may be used to produce sulfuric acid, and carbon dioxide which may be used in the manufacture of carbon monoxide. From an olfactory aspect it is also desirable in many cases to remove the acidic materials from gases vented to the atmosphere, such as flue gases and waste refinery gases.

Generally fluids containing these acidic impurities are treated by contacting the fluids, either in the liquid or vapor phase, with a suitable absorption medium to remove the undesirable impurities. Gases containing the impurities are passed into the lower portion of an absorption column to contact a downflowing liquid absorption medium. The gaseous effluent removed from the upper portion of the column is substantially free from the acidic impurities. The absorption medium is passed from the absorption column to a stripping or reactivation zone for removal of the acidic impurities from the absorption medium. The reactivated absorption medium may then be recycled to the absorption column. Commonly in these absorption processes for purifying gases, some of the absorption medium is entrained in the gaseous effluent and some is lost in the overhead from the stripping zone. This loss of absorption medium necessitates the addition of make-up absorption medium into the process. It has been found, according to this invention, that it is desirable to add the absorption medium or the solvent at a particular location in the absorption-stripping cycle and in a particular manner.

The removal of acidic materials from fluids in the above described manner is used at some point in the production of such materials as toluene, synthetic ammonia, synthetic rubber, sulfuric acid, aviation gasoline, ammonium nitrate, hydrogen, carbon monoxide, fuel gas, and light weight metals.

An object of this invention is to remove acidic materials from fluids containing the same.

It is also an object of this invention to remove hydrogen sulfide from low-boiling hydrocarbon mixtures containing the same.

Still another object of this invention is to provide a method for the addition of make-up absorption medium in an absorption process.

Yet another object is to provide a method for accurate control for stripping an absorption medium of material dissolved therein.

It is still a further object to provide an improvement in the operation of the absorption-stripping cycle of an absorption process for the removal of acidic material from fluids containing the same.

Further objects and advantages of the present invention will become apparent to those skilled in the art from the following discription and disclosure.

According to this invention a fluid containing acidic materials is passed to an absorption zone and is contacted with a suitable absorption medium to remove the acidic materials. In a preferred modification of this invention a gaseous stream containing acidic materials is introduced into the lower portion of an absorption column wherein it passes upward countercurrently to a downflowing liquid aqueous absorption medium. The aqueous absorption medium is introduced and the effluent is removed from the upper portion of the column. Enriched aqueous absorption medium is removed as a liquid from the lower portion of the absorption column and passes to the upper portion of a stripping or reactivation column. In the stripping column the acidic materials in the absorption medium are desorbed therefrom and are removed as a gaseous effluent from the upper portion of the stripping column. Liquid absorption medium is withdrawn from the lower portion of the stripping column and recycled to the absorption column.

Since a portion of the aqueous absorption medium is lost in the absorption column by entrainment in the vapor therefrom and since some water vapor is also lost with overhead vapor from the stripping column, water or absorption medium is added to the system to compensate for the loss. It has been found that the operation of the process is greatly enhanced by addition of water or absorption medium into the lower portion of the stripping column rather than into the absorption column or other location in the absorption-stripping circuit.

In the operation of an absorption process as described herein, it is desirable to maintain the composition of the aqueous absorption medium constant with respect to solute and solvent of the absorption medium itself. It is also necessary that a certain amount of water be vaporized in the lower portion of the stripper to assure efficient stripping of the acidic materials from the enriched absorption medium. These desired conditions of operation may best be accomplished by adding the make-up water into the lower portion of the stripper. Moreover, if water is added prior to the stripper, a dilute aqueous absorption medium enters the stripper, which results in flashing and foaming of the absorption medium in the upper portion of the stripping column.

It has further been found that the continuous introduction of water into the lower portion of the stripping column to maintain a substantially constant water content of the absorption medium results in the most efficient and effective stripping of the absorption medium. This is accomplished by continuously introducing water into the lower portion of the stripping column at a rate required to maintain a substantially constant predetermined kettle temperature. When the kettle temperature rises more water is introduced per unit of time, thus decreasing the boiling point of the aqueous solution. When the kettle temperature falls, less water is introduced per unit of time, which results in an increase in the boiling point of the aqueous solution. To accomplish the above, an automatic flow control valve in the water inlet conduit is regulated by the kettle temperature in the stripping column by means responsive to said kettle temperature. The kettle temperature is the boiling point of the aqueous absorption medium in the bottom of the stripping column, which boiling point is a function of the water content of the absorption medium.

A conventional automatic valve is used to control the flow of water. The valve may be either air operated, or electrically operated by a motor, or any other conventional method for operating the valve may be employed without departing from the scope of this invention. Various temperature responsive devices known in the art may be adapted to actuate the automatic valve as conditions of temperature require. Electrical controllers using thermocouples sensitive to the kettle temperature are preferred. However, other conventional devices, such as those using thermal responsive metal strips, or liquids, or gases, may also be used.

In operating the stripping column according to this invention, the composition of the absorption liquid in the bottom of the stripping colum is maintained substantially constant as determined by the desired kettle temperature set in the stripping column. The required amount of vaporization of water from the aqueous absorption medium to assure effective stripping is accomplished by controlling the amount of heat supplied to the absorption liquid at the bottom of the stripping column.

The introduction of water into the stripping column in a batchwise manner often results in an excessive water content of the absorption solution when the water is first introduced, which causes loss of the absorption medium by entrainment and, in extreme case, by the formation of a stable foam. Just prior to the introduction of water the water content is often very low, which as the result of a substantially constant heat input prevents the absorption solution from boiling and consequently causes incomplete reactivation of the absorption solution.

By aqueous absorption medium as used in the present specification is meant any liquid aqueous medium which will remove acidic materials from the fluid to be treated by either solubility of the acidic materials therein or by chemical combination therewith.

The preferred application of the present invention is in the removal of hydrogen sulfide from a gaseous hydrocarbon stream by contact with a suitable absorption medium. Absorption mediums suitable for the removal of hydrogen sulfide, carbon dioxide, and other acidic gases comprise aqueous solutions of organic bases, such as monoethanolamine, diethanolamine, triethanolamine, diethanolamine-diethylene glycol, sodium phenolate; and aqueous solutions of sodium thioarsenate, sodium carbonate, sodium and potassium alcoholates, and an alkali metal or an alkaline earth hydroxide which may be admixture with suitable solventizers such as morpholine, nitromethane, copal, polyalkylenes and polyamines. Since the absorption medium is an aqueous solution, the introduction of water into the stripping zone results in a dilution of the aqueous absorption medium. The absorption medium is concentrated in the stripping zone, i. e., the excess water is removed as a vapor with the acidic materials from the upper portion of the stripping zone.

The fluid to be treated in the absorption zone may be in either the vapor or the liquid phase. In case the fluid is a liquid, such as a liquid hydrocarbon stream used as a polymerization feed stock, a liquid stream is passed upward through the absorption zone countercurrent with the downward flow of the liquid absorption medium.

The drawing diagrammatically represents an arrangement of apparatus for carrying out the process of this invention to be described more fully hereinafter. In order that this invention may be clearly understood and its applicability realized, a brief description of a process for the removal of hydrogen sulfide from a gaseous hydrocarbon stream by contact with an amine solution will be made. A hydrocarbon stream such as natural gas containing hydrogen sulfide in an amount between about 2 to about 2000 grains per 100 cu. ft. of gas (standard conditions) is passed to absorber 6 through line 4. The hydrocarbon stream passes upward through baffles, trays, or packing in absorber 6 countercurrent to a downflowing amine solution. A hydrocarbon stream substantially free from hydrogen sulfide and any other acidic material is removed from absorber 6 through line 7. The hydrogen sulfide of the effluent hydrocarbon stream is below about 1½ grains and may be as low as about 0.02 grain per 100 cubic feet of gas. An aqueous amine solution is introduced into the upper portion of absorber 6 through line 9. A typical aqueous amine solution may comprise a mixture of about 40 to about 50 per cent diethanolamine and about 25 to about 40 per cent diethylene glycol. The enriched amine solution is removed from absorber 6 and passed to heat exchanger 11 through line 8 and thence through line 12 to stripper 13.

Suitable temperatures and pressures are maintained in absorber 6 to assure removal of substantially all of the hydrogen sulfide from the hydrocarbon stream by absorption. The pressure within absorber 6 corresponds generally to the pressure available on the incoming hydrocarbon stream. A temperature is maintained in absorber 6 above the dew point of the hydrocarbon stream being treated. In general the temperature is maintained between about 60 to about 150° F. and a pressure is maintained between atmospheric and about 800 pounds per square inch gage.

Hydrogen sulfide and other acidic materials dissolved in the enriched liquid amine solution are desorbed in stripper 13. Hydrogen sulfide and the water vapor pass overhead from stripper 13 through line 14 and condenser 15 to accumulator 17. Water vapor is condensed in condenser 16 and the resulting condensate is collected in the lower portion of accumulator 17. Hydrogen sulfide and other gases are vented from the system through line 19. A portion or all of the condensate in accumulator 17 may be passed through line 18 to the upper portion of stripper 13 as reflux therefor. Liquid amine solution, substantially free from hydrogen sulfide, accumulates in the lower portion of stripper 13. A portion of this liquid amine solution is passed through line 25 to reboiler 27 and recycled to the lower portion of stripper 13 through line 26. Steam is introduced into reboiler 27 through line 28. The reactivated amine solution is withdrawn from stripper 13 through line 22 and recycled to absorber 6 through heat exchanger 11, line 23, cooler 24, and line 9.

Generally a temperature between about 200 and about 300° F. and a pressure between about atmospheric and about 30 pounds per square inch gage are maintained in stripper 13. Stripper 13 contains conventional bubble trays, baffles, or packing to assure effective removal of acidic material from the absorption liquid.

In the preferred embodiment of the present invention steam condensate from reboiler 27 comprises a convenient source of water to be introduced into stripper 13 through line 32. Steam condensate is removed from reboiler 27 and passed through line 29 and line 31, flow control valve 33, and line 32 to stripper 13. Excess condensate may be withdrawn from the system through line 29 if necessary.

An alternative but less preferred method for supplying water to stripper 13 comprises passing aqueous condensate from accumulator 17 through line 21, line 31, and line 32. Excess condensate from accumulator 17 may be removed from the system through line 21. If the quantity of condensate from either reboiler 27 or accumulator 17 is insufficient to supply the necessary water to stripper 13, the two streams from reboiler 27 and accumulator 17 may be combined, or additional water or absorption medium may be introduced through line 32.

The kettle temperature in reboiler 27 operates automatic flow control valve 33 by means of a conventional temperature recorder or controller 36 and transmission means 34, as previously discussed. Illustrations and details for flow control responsive to temperature are adequately discussed in chapter X, page 474, of "Industrial Instruments for Measurements and Control"; Rhodes, T. J.; 1941; McGraw-Hill Book Co., Inc. Thus, when the kettle temperature falls, valve 33 decreases the rate of flow of water into the lower portion of stripper 13, which results in a decrease in the water content of the absorption solution and a rise in boiling point of the solution. When the kettle temperature rises, valve 33 increases the rate of flow of water into stripper 13, which results in an increase in the water content of the absorption solution and a lowering of the boiling point of the solution. Sufficient steam is supplied to reboiler 27 through line 28 at a substantially constant rate to maintain the absorption solution boiling. Generally, an amount of water between about 8 and about 12 weight per cent of the incoming aqueous amine solution is vaporized in stripper 13 to assure effective stripping of acidic materials from the amine solution.

Usually, the quantity of the amine solution introduced into stripper 13 is substantially constant, however, if the quantity of solution varies considerably a flow control valve may be attached to line 28 to control the flow of steam with respect to the quantity of amine solution. When the quantity of amine solution is increased a corresponding increase in steam is required to evaporate the necessary amount of water from the solution.

The process for removal of acidic materials from fluids by absorption in an amine solution is based on the chemical phenomenon that acidic materials such as hydrogen sulfide and carbon dioxide react with an amine to form a chemical compound which may be dissociated by heat. For example, typical reactions between a primary amine and hydrogen sulfide are as follows:

$$2RNH_2 + H_2S \rightleftarrows (RNH_3)_2S$$

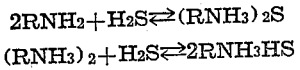

$$(RNH_3)_2 + H_2S \rightleftarrows 2RNH_3HS$$

These reactions are reversible, the equilibria depending upon the concentrations of the reactants and the temperature.

*Example*

In a typical absorption process using this invention, 5 million cubic feet per day of propane-rich cracking feed which contained between about 450 and about 500 grains of hydrogen sulfide per 100 cubic feet of gas (standard conditions) and 3 million cubic feet per day of refinery vapors which contained between about 1000 and about 1200 grains of hydrogen sulfide per 100 cubic feet of gas were treated with an amine solution to remove the hydrogen sulfide therefrom. These two hydrocarbon streams were treated separately in two bubble tray absorbers operating at a pressure between about 150 and about 200 pounds per square inch gage and at a temperature between about 90 and about 120° F. The total treating solution rate to both absorbers was about 35 gallons per minute. The amine solution contained between about 40 and about 45 weight per cent diethanolamine, between about 35 and about 40 weight per cent diethylene glycol, and between about 15 and about 20 weight per cent water. This solution was reactivated in a bubble tray stripper which had a kettle temperature between about 240 and about 265° F., in particular about 255° F. and a constant steam input rate to the reboiler between about 1.0 and about 1.3 pounds of steam per gallon of amine solution entering the stripper. The stripper operated at the lowest possible pressure, usually between about one-half and about 20 pounds per square inch gage. The control temperature for the continuous introduction of water into the stripper was the boiling point of the amine solution of the above composition. The rate at which the water was introduced into the stripper varied between about 5 and about 15 volume per cent of the rate of the incoming amine solution. Water vapor in the overhead from the stripper was condensed and recycled to the stripper as liquid reflux.

The operation of the process according to this invention resulted in a constant composition of the amine solution withdrawn from the stripper, and also decreased the water content of the vapor leaving the absorber. In general, a more uniform operation of the entire absorption process was obtained by the continuous introduction of water into the lower portion of the stripper.

For convenience and clarity certain apparatus, such as pumps, surge tanks, accumulators, etc., have not been shown in the drawing. Obviously certain modifications of the present invention may be practiced without departing from the scope of the invention.

I claim:

1. In an absorption process in which an aqueous absorption liquid is used to remove a volatile acidic material from a fluid, the improvement which comprises passing at a constant rate a stream of a fluid containing a substantially constant amount of a volatile acidic material through an absorption zone, passing at a constant rate a stream of said absorption liquid having a constant composition to said absorption zone, constantly withdrawing a resulting enriched absorption liquid from said zone and passing the same to a stripping zone in the bottom portion of which a body of said liquid is maintained, removing volatile acidic material and some water vapor from the upper portion of said stripping zone, supplying heat to said body of liquid by indirect heat exchange so as to effect a boiling thereof and removal of volatile acidic material therefrom, adding make-up water from an outside source to said body of liquid in said stripping zone to dilute the same at such variable rate in accordance with the temperature of said body as to maintain said body at a constant desired boiling temperature.

2. In a process for removing hydrogen sulfide from a gaseous hydrocarbon mixture by absorption in an aqueous absorption liquid comprising diethanolamine and diethylene glycol, the improvement which comprises passing at a constant rate a gaseous hydrocarbon stream containing a substantially constant amount of hydrogen sulfide through an absorption zone, passing at a constant rate a stream of said absorption liquid having a constant composition to said absorption zone, constantly withdrawing a resulting enriched absorption liquid from said zone and passing the same to a stripping zone in the bottom portion of which a body of said liquid is maintained, removing hydrogen sulfide and some water vapor from the upper portion of said stripping zone, supplying heat to said body of liquid by indirect heat exchange so as to effect a boiling thereof and removal of hydrogen sulfide therefrom, adding make-up water from an outside source to said body of liquid in said stripping zone to dilute the same at such variable rate in accordance with the temperature of said body as to maintain said body at a constant desired boiling temperature.

3. The process of claim 2 in which said acidic material comprises hydrogen sulfide, said fluid comprises low-boiling hydrocarbons, and said aqueous absorption liquid comprises an amine solution.

4. The process of claim 2 in which said aqueous absorption liquid comprises a solution of diethanolamine and diethylene glycol.

5. The process of claim 2 in which said aqueous absorption liquid comprises a solution of sodium carbonate.

6. The process of claim 2 in which said aqueous absorption liquid comprises a solution of an alkali metal hydroxide.

7. The process of claim 2 in which the rate of water addition to said stripping zone is between about 5 and about 15 volume per cent of the rate of said enriched absorption liquid being passed to said stripping zone.

CLYDE P. STANLEY.

REFERENCES CITED

The following references are of record in the file of this patent:

UNITED STATES PATENTS

| Number | Name | Date |
|---|---|---|
| 1,834,016 | Bottoms | Dec. 1, 1931 |
| 2,002,357 | Shoeld | May 21, 1935 |
| 2,177,068 | Hutchinson | Oct. 24, 1939 |
| 2,242,323 | Powell | May 20, 1941 |
| 2,355,147 | Chazanow | Aug. 8, 1944 |
| 2,368,595 | Johnson | Jan. 30, 1945 |

Certificate of Correction

Patent No. 2,487,577

November 8, 1949

CLYDE P. STANLEY

It is hereby certified that errors appear in the printed specification of the above numbered patent requiring correction as follows:

Column 4, line 35, after the words "may be" insert *in*; column 6, line 46, for "$(RNH_3)_2 + H_2S \rightleftarrows 2RNH_3HS$" read $(RNH_3)_2S + H_2S \rightleftarrows 2RNH_3HS$; and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*